(12) United States Patent
Potbhare et al.

(10) Patent No.: US 9,449,165 B2
(45) Date of Patent: Sep. 20, 2016

(54) SYSTEM AND METHOD FOR WIRELESS PROXIMITY-BASED ACCESS TO A COMPUTING DEVICE

(71) Applicants: Siddharth Potbhare, Gaithersburg, MD (US); Stefan Giroux, Annapolis, MD (US); Neil Goldsman, Takoma Park, MD (US); Akin Akturk, Gaithersburg, MD (US)

(72) Inventors: Siddharth Potbhare, Gaithersburg, MD (US); Stefan Giroux, Annapolis, MD (US); Neil Goldsman, Takoma Park, MD (US); Akin Akturk, Gaithersburg, MD (US)

(73) Assignee: UNTETHERED LABS, INC., College Park, MD (US)

( * ) Notice: Subject to any disclaimer, the term of this patent is extended or adjusted under 35 U.S.C. 154(b) by 0 days.

(21) Appl. No.: 14/615,567

(22) Filed: Feb. 6, 2015

(65) Prior Publication Data
US 2015/0302188 A1    Oct. 22, 2015

Related U.S. Application Data

(60) Provisional application No. 61/936,709, filed on Feb. 6, 2014.

(51) Int. Cl.
*G06F 21/00* (2013.01)
*G06F 21/35* (2013.01)
(Continued)

(52) U.S. Cl.
CPC ............... *G06F 21/35* (2013.01); *G06F 21/57* (2013.01); *H04L 9/3226* (2013.01);
(Continued)

(58) Field of Classification Search
CPC ........ G06F 21/34; G06F 21/35; G06F 21/57; G06F 21/88; H04W 12/00; H04W 12/08; H04W 12/06
See application file for complete search history.

(56) References Cited

U.S. PATENT DOCUMENTS

2004/0046638 A1    3/2004    Kawasaki
2005/0076242 A1    4/2005    Breuer
(Continued)

FOREIGN PATENT DOCUMENTS

| KR | 10-0769965 | 10/2007 |
|----|------------|---------|
| WO | 2006/074490 | 7/2006 |
| WO | 2014/005004 | 1/2014 |

OTHER PUBLICATIONS

"Data security and user authentication for PC and Mac." Rohos.com May 2011. http://www.rohos.com/2011/05/new-security-features-with-wireless-pc-lock/.

(Continued)

*Primary Examiner* — Edward Zee
(74) *Attorney, Agent, or Firm* — Whiteford, Taylor & Preston, LLP; Gregory M. Stone

(57) ABSTRACT

Disclosed herein is a system and method for wireless proximity-based access to a computing system, which in accordance with certain aspects of an embodiment of the invention includes a small, portable, person-carried or personal-item-carried (e.g., by attachment to a user's key's, purse, knapsack, etc.) wireless transmitter that serves as a "key," and a wireless receiver configured for attachment to the computing system that serves as a "lock." The lock may comprise, for example, a USB device that both wirelessly communicates with the key to detect its physical proximity, and communicates with the computer access software that is native on the computing system (e.g., standard WINDOWS username and password authentication processes) to either allow or disallow such computer access software from allowing access to the computing system based upon the physical proximity of the key to the lock.

22 Claims, 5 Drawing Sheets

(51) Int. Cl.
  *H04W 12/08* (2009.01)
  *H04L 9/32* (2006.01)
  *G06F 21/57* (2013.01)
  *H04L 29/06* (2006.01)
  *H04W 4/00* (2009.01)
  *H04W 12/06* (2009.01)

(52) U.S. Cl.
  CPC ........ *H04L 9/3234* (2013.01); *H04L 63/0492* (2013.01); *H04W 4/008* (2013.01); *H04W 12/06* (2013.01); *H04W 12/08* (2013.01)

(56) References Cited

U.S. PATENT DOCUMENTS

| | | |
|---|---|---|
| 2007/0006290 A1 | 1/2007 | Li |
| 2007/0090965 A1 | 4/2007 | McCall |
| 2009/0006846 A1 | 1/2009 | Rosenblatt |
| 2011/0314539 A1 | 12/2011 | Horton |
| 2012/0036556 A1 | 2/2012 | LeBeau et al. |
| 2013/0225127 A1* | 8/2013 | Cavacuiti ............... H04M 1/67 455/411 |
| 2013/0335193 A1 | 12/2013 | Hanson et al. |

OTHER PUBLICATIONS

Gechlik, Karl L. "How to Lock Your Computer with Bluetooth Proximity Lock Utility." Makeuseof.com Apr. 2, 2010. http://www.makeuseof.com/tag/lock-windows-computer-bluetooth-proximity-lock-utility/.

Lavars, Nick. "Gatekeeper Chain key fob automatically locks your PC when AFK." Gizmag.corn Feb. 5, 2014. http://www.gizmag.com/gatekeeper-unlock-pc-proximity/30737/.

MapPin Softawre. "Token Lock." Mac App Store. https://itunes.apple.com/us/app/tokenlock/id402433482?mt=12, Year: 2014.

Profis, Sharon. "Lock and unlock your computer with a USB drive, secret agent style" cnet.com May 7, 2012. http://www.cnet.com/how-to/lock-and-unlock-your-computer-with-a-usb-drive-secret-agen . . . .

"UMD Company CoolCAD Launches Kickstarter Campaign for Security Keychain that Locks Your Computer When You Are Away." PR Newswire. Feb. 19, 2014.

Yuri, Kageyama. "Security phone knows when owner strays too far: [Central Edition]" Buffalo News. Nov. 20, 2006.

* cited by examiner

SYSTEM AND METHOD FOR WIRELESS PROXIMITY-BASED ACCESS TO A COMPUTING DEVICE

CROSS REFERENCE TO RELATED APPLICATION

This application is based upon and claims benefit of U.S. Provisional Patent Application Ser. No. 61/936,709 entitled "A Bluetooth Low Energy Device for Locking and Unlocking a Computer," filed with the U.S. Patent and Trademark Office on Feb. 6, 2014 by the inventors herein, the specification of which is incorporated herein by reference in its entirety.

FIELD OF THE INVENTION

This invention relates generally to controlling access to computing devices, and more particularly to systems and methods for automatic user authentication to computing systems based on proximity of the user to the computing device.

BACKGROUND OF THE INVENTION

Data security and privacy is an issue of growing importance to computer users across nearly every industry. Many companies, governmental agencies, enterprises, and users of computers, generally, try to implement information technology ("IT") security and privacy policies in order to protect their data. For example, such policies may require that a user provide a username and password in order to access the enterprise's computer systems. Moreover, such policies may require that employees never leave their computers unattended and logged in. Unfortunately, many computer users may fail to follow such policies for a variety of reasons, including the possibility of simply forgetting to take the actions to lock the computer that those policies require.

Further, some policies may require that the user maintain a physical device, such as a token generator, that additionally requires the user to input a unique device-generated code each time they log into the system to further enhance security. While helpful, such protections obviously require that the user have such physical device with them when they intend to access the protected computer systems, and simple human nature can invariably lead to a user's inadvertent loss or temporary misplacement of such physical device, impeding their ability to perform their assigned tasks.

Prior efforts have been made to provide wireless access to computing systems using a wireless connection between a user's cell phone and software on the computing system. However, such systems have been found to significantly degrade battery life of the phone, requiring constant recharging if the security device is to be implemented, which detracts from wide acceptance of such methods.

Thus, there remains a need in the art for systems and methods that are effective in protecting against unauthorized access to computer systems, but that do so in a way that minimizes the required actions of the user and that can provide some protection against many person's at least occasional tendency to forget or misplace items that might be necessary to access such computer systems. It would also be advantageous for such functions to be embodied in a standalone, low energy usage device that is not dependent upon a power source that must be kept available for other tasks, such as a user's portable cell phone. It would further be advantageous, and would assist user adaptation of such a system, if the system is designed to have a minimal level of erroneous logging-off and logging-on incidents, as well as a high level of and rapid responsivity, and to properly manage the trade-off between these goals and an acceptable battery life.

SUMMARY OF THE INVENTION

Disclosed herein is a system and method for wireless proximity-based access to a computing system, which in accordance with certain aspects of an embodiment of the invention includes a small, portable, person-carried or personal-item-carried (e.g., by attachment to a user's key's, purse, knapsack, etc.) wireless transmitter that serves as a "key," and a wireless receiver configured for attachment to the computing system that serves as a "lock." The lock may comprise, for example, a USB device that both wirelessly communicates with the key to detect its physical proximity, and communicates with the computer access software that is native on the computing system (e.g., standard WINDOWS username and password authentication processes) to either allow or disallow such computer access software from allowing access to the computing system based upon the physical proximity of the key to the lock.

In accordance with a particularly preferred embodiment of the invention, a system for wireless proximity-based access to a computing device is provided including a portable wireless transmitter having a unique electronic address code associated therewith, a wireless receiver configured for connection to a computing device and for wireless communication with the wireless transmitter, and a computer software program executable on the computing device and configured to cause the computing device to:

generate an encrypted electronic file comprising the unique address code associated with the wireless transmitter, an encrypted version of a username of a user associated with the wireless transmitter, and an encrypted version of a password of the user associated with the wireless transmitter;

provide an electronic instruction to the wireless receiver to search for a wireless transmitter having a unique address code matching the unique address code in the encrypted electronic file;

make a determination of at least whether to maintain the computing device in a locked state preventing access to functions of the computing device, to change a state of the computing device to a locked state preventing access to functions of the computing device, or to change a state of the computing device to an unlocked state allowing access to functions of the computing device, wherein the determination is based upon a comparison of relative differences between (i) a difference between a numeric value representative of a signal strength parameter of a data packet requested by the wireless receiver and transmitted by the wireless transmitter to the wireless receiver and a normalized far signal strength value representing a signal strength level indicating that the wireless transmitter has been moved a first distance away from the wireless receiver, and (ii) a difference between the numeric value representative of a signal strength parameter of the data packet requested by the wireless receiver and transmitted by the wireless transmitter to the wireless receiver and a normalized near signal strength value representing a signal strength level indicating that the wireless transmitter has been moved a second distance away from the wireless receiver, which second distance is less than the first distance; and in response to that determination, instructing the wireless receiver to either prevent access to functions of the computing device or to allow access to functions of the computing device.

BRIEF DESCRIPTION OF THE DRAWINGS

The numerous advantages of the present invention may be better understood by those skilled in the art by reference to the accompanying drawings in which:

FIG. 2 is a schematic view of a wireless transmitter key for use with the system of

FIG. 1.

DETAILED DESCRIPTION OF THE PREFERRED EMBODIMENTS

Figure 1:
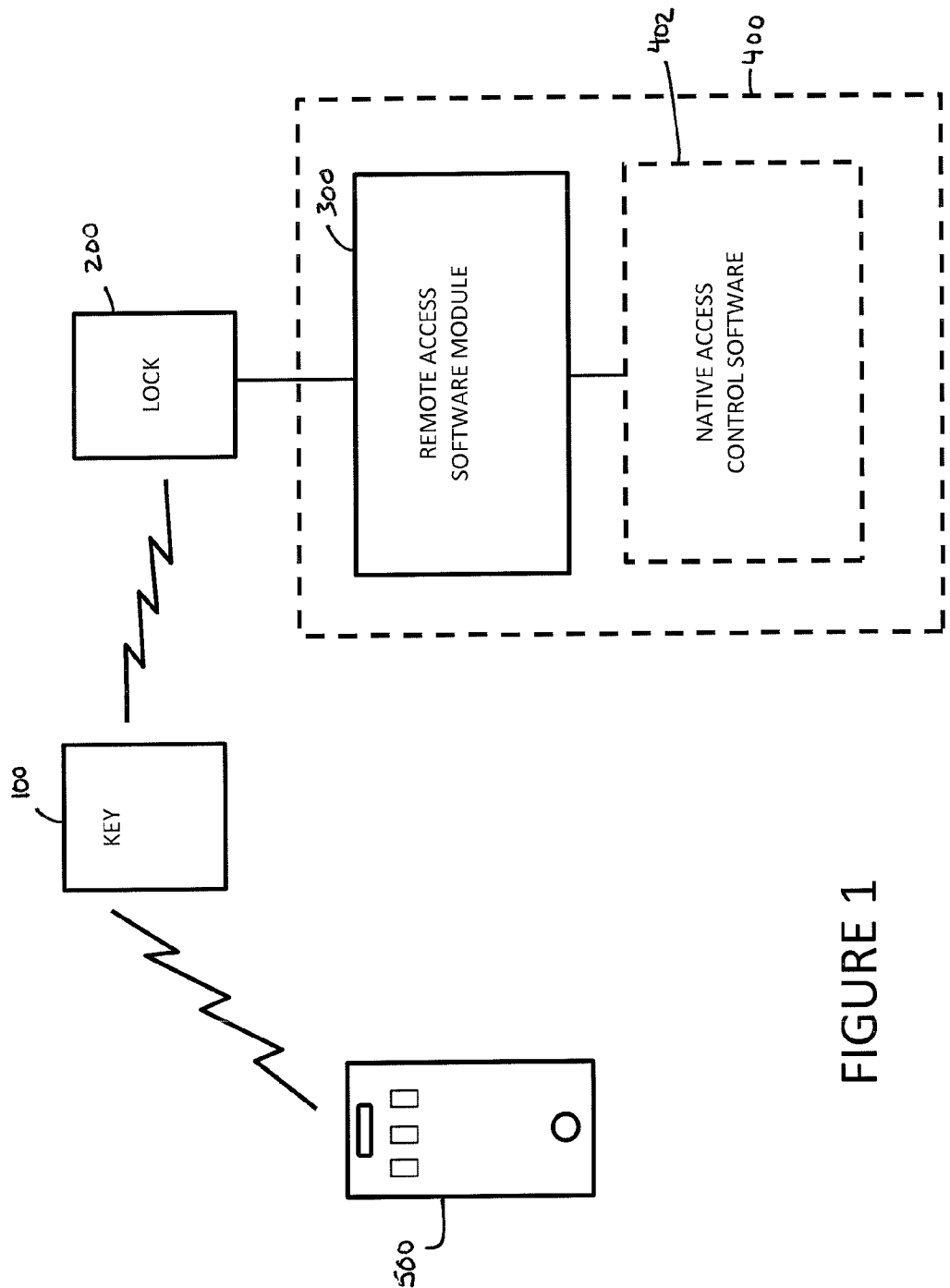
FIG. 1 is a schematic view of a system for wireless proximity-based access to a computing device in accordance with certain aspects of an embodiment of the invention.
Figure 2:
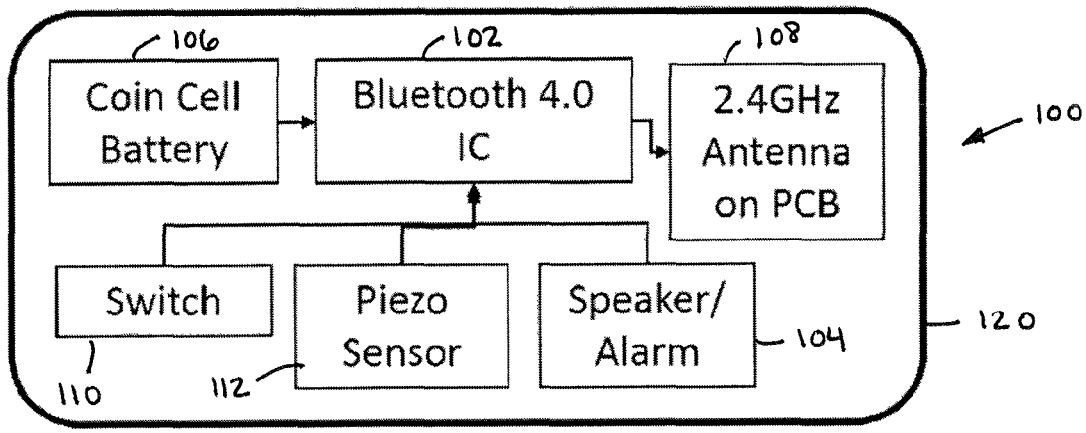

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In accordance with certain aspects of an embodiment of the invention, a system and method for wireless proximity-based access to a computing system is disclosed that provides privacy and security to the average computer user by locking access to the computing system when the user moves away from the system, and then allowing access when the user returns to a location near the system. The system includes a small, portable, person-carried or personal-item-carried (e.g., by attachment to a user's keys, purse, knapsack, etc.) wireless transmitter that serves as a "key," and a wireless receiver configured for attachment to the computing system that serves as a "lock." The key may use, by way of non-limiting example, public and private key encryption for identification and authentication of the key, such that a unique key can "operate" a lock. The key is preferably powered by a common coin cell battery, and current implementations use a Bluetooth 4 (aka Bluetooth SMART and Bluetooth Low Energy) chipset for secure, ultra-low power, wireless communications between the lock and the key. Of course, other wireless communication protocols implementing low energy wireless communications as may be developed in the future will likewise be suitable and deployable by persons skilled in the art, and do not depart from the spirit and scope of the invention. The key is preferably less than 3 cm×4 cm in size, and approximately 5 mm thick, allowing it to be easily carried on a person's key ring, attached to a purse or knapsack, or the like without being obstructive.

The lock may comprise, for example, a USB device that both wirelessly communicates with the key to detect its physical proximity, and communicates with the computer access software that is native on the computing system (e.g., standard WINDOWS username and password authentication processes) to either allow or disallow such computer access software from allowing access to the computing system based upon the physical proximity of the key to the lock. The key and lock preferably use secure, ultra-low power, wireless communication (e.g., Bluetooth 4 technology) to keep prying eyes away from the user's computing system.

For the office worker, accountant, lawyer, IT professional, health care professionals, teachers, and anyone who works with a computer, the system described herein may offer an easy way of providing elementary privacy and security. Businesses will thus reap the benefits of additional security, and will also educate employees in basic computer security habits.

The software described herein that is configured for use with the key and the lock may optionally be integrated into existing employee management software, and thereby add the secure, ultra-low power, wireless communication (e.g., Bluetooth 4) enabled lock/unlock functionality to existing IT management systems.

With reference to the schematic view of FIG. 1, the overall system for wireless proximity-based access to a computing device set forth herein comprises a pair of devices, namely key 100 and lock 200, and associated user-interface software implementing a remote access software module 300 configured to provide privacy and security to the users of computing devices by invoking the locking access control (e.g., screen-locking) features that are embodied in the access control software 402 that is native to the user's computing device 400 when the user moves away from the computing device 400, and invoking the unlocking access control features that are embodied in such native access control software 402 when the user moves within a preset range of the computing device 400. As described herein, the key 100 and lock 200, along with the computer software program implementing remote access software module 300 that is installed on the user's device 400 for enabling use of the key 100 and lock 200 with the computing device 400, may also be used in a configuration in which access is allowed only when the user carries one of the devices and manually inputs the user's password on the computing device 400.

The key 100 is preferably comprised of a printed circuit board integrated in an enclosure 120, and is shown schematically in FIG. 1. The printed circuit board is designed to carry an integrated circuit 102 implementing secure, ultra-low power, wireless communications (e.g., the Bluetooth Low Energy standard configuration). The integrated circuit may also carry out various microprocessor functions, such as by way of non-limiting example controlling an audible device 104 (such as a beeper generating an audible tone as discussed further below), reporting battery status to the other system components, etc. The printed circuit board may also carry a battery 106, an antenna 108 implemented by, for example, circuit board metal traces (although other antenna configurations may likewise be used as may be desired for varying applications), and electronics to control the power flow to these components. In some embodiments, the battery may be a lithium-ion or lithium polymer coin-type battery, a lithium manganese battery, or such other compact battery configurations as may be apparent to those of ordinary skill in the art. By way of non-limiting example, the battery may be a thin film battery, an alkaline battery or a metal-hydride battery. Further, the state-of-charge of the battery may optionally be monitored by the integrated circuit and assisting electronics, and the information may be transferred to the lock and to the installed on the user's computing system that enables operation of the key and lock. The key may also include a switch, such as a physical switch 110 and/or piezo sensor switch 112, which may be used to initiate functions of the system.

Figure 3:
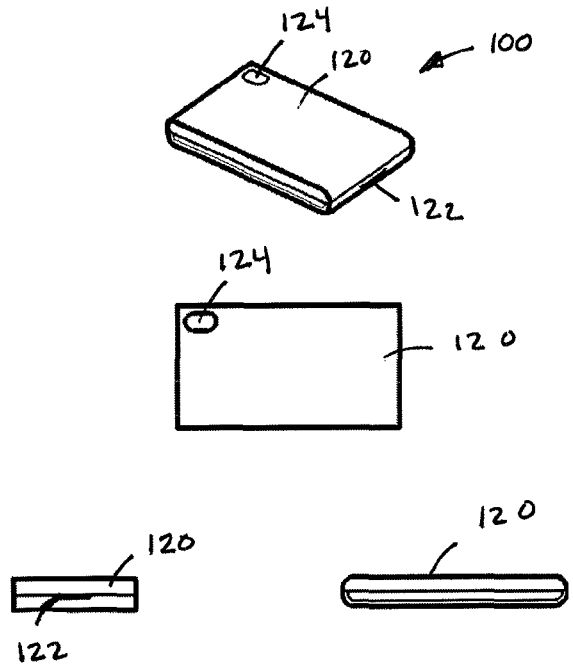
FIG. 3 provides perspective, top, end, and side views of the wireless transmitter key of FIG. 2.
Figure 4:
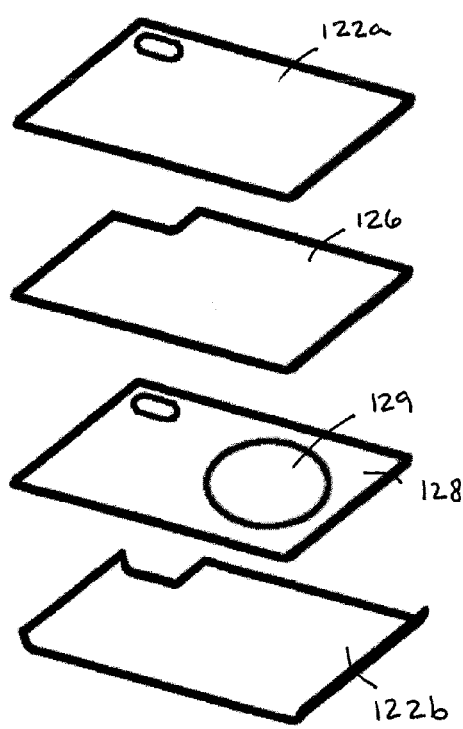
FIG. 4 provides an exploded view of the wireless transmitter key of FIG. 3.

FIG. 3 provides perspective, top, end, and side views of key enclosure 120, which may be designed to be opened via a notch 122 in an end of enclosure 120 by the end-user to install or replace the battery and to be closed again robustly. The key enclosure 120 may also be designed to incorporate a hole 124, such as in one corner of the key enclosure, configured to allow the key to be attached to a keychain or key ring. Further, the key enclosure 120 may be comprised of plastic, such as (by way of non-limiting example) acrylonitrile butadiene styrene, commonly known as ABS. FIG. 4 shows an exploded view of key 100, reflecting the layered assembly of top portion 120*a* of key enclosure 120, bottom portion 120*b* of key enclosure 120, printed circuit board 126, and battery holder 128 holding battery 129.

Figure 6:
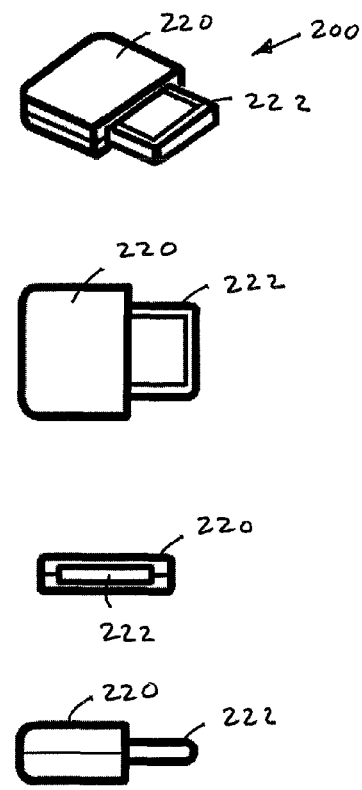
FIG. 6 provides perspective, top, end, and side views of the wireless receiver lock of FIG. 5.
Figure 5:
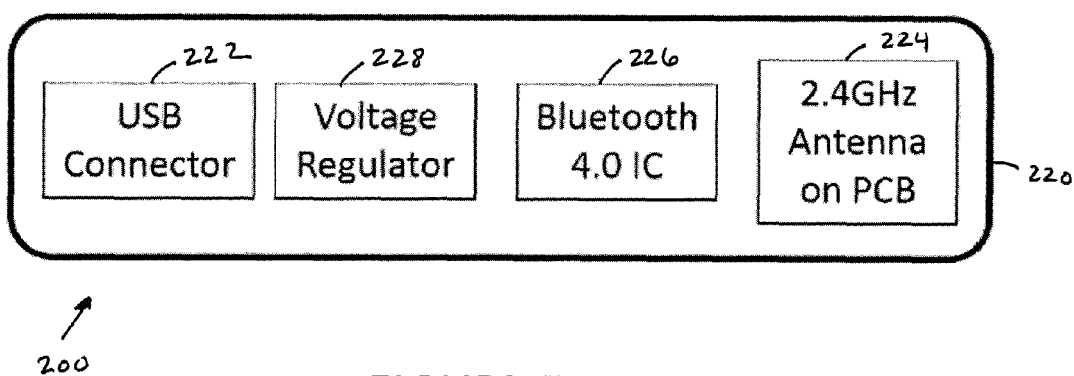
FIG. 5 is a schematic view of a wireless receiver lock for use with the system of FIG. 1.

The lock 200 is preferably comprised of a printed circuit board integrated in an enclosure 220, and is shown schematically in FIG. 5. FIG. 6 likewise provides perspective, top, end, and side views of lock enclosure 220. One edge of the lock enclosure 220 has a connector 222 designed to fit the standard female USB sockets of common personal computing devices. The printed circuit board is shaped to fit this connector and standard USB connection pads are implemented as required. The printed circuit board is designed to also bear an antenna 224 implemented, for example, by metal traces, by wire antenna, via a chipset, etc., and likewise includes an integrated circuit 226 implementing secure, ultra-low power, wireless communication (e.g., the Bluetooth Low Energy 4.0 protocol), USB HID (Human Interface Device) and/or USB CDC (Communication Device Class) and/or USB HCI (Human Computer Interface) protocol, microprocessor/signal-processing functions, and electronics to condition the power supply to the integrated circuit. Preferably, the lock 200 includes a voltage regulator 228 configured to convert the voltage output of 5V from the computer's USB port into 3.3V that is used by the Bluetooth 4.0 integrated circuit. The lock enclosure 220 may be comprised of plastic, such as (by way of non-limiting example) acrylonitrile butadiene styrene, commonly known as ABS.

In addition to the lock 200 and key 100, a computer software program is provided that implements remote access software module 300, and that is executable on the computing system to which the lock 200 and key 100 are intended to regulate access. The computer software program may incorporate the following functions and component parts:

USB Lock device driver
Key registration
Computing device locking function
Computing device unlocking function
Locking/unlocking decision engine The USB drivers for the lock 200 are installed during the installation of the computer software program on the computing device 400. This driver enables the lock 200 to be recognized by the computing device 400 as a communication port and thereby interact with the operating system of the computing device 400 in a suitable manner.

Initial registration of the key may proceed as follows. The user turns the key 100 on by installing the battery, and turns the lock 200 on by connecting it to the computing device 400. Once turned on, the key 100 starts periodically "advertising" by broadcasting its unique address code (e.g., a 6-byte code), which is hard-coded into its firmware during the manufacturing of the integrated circuit incorporated in the key 100. When the lock 200 and key 100 are in use for the first time, the user is instructed to keep the key 100 close to the lock 200. The computer software program then instructs the lock 200 to communicate with keys in the vicinity that are advertising their unique addresses. After finding the keys in the vicinity, the lock 200 chooses the key 100 that is closest to it by measuring the strength of the radio signal emitted by the keys and selecting the strongest one. The lock 200 then establishes a connection with the key 100 using secure, ultra-low power, wireless communications (e.g., the pre-defined Bluetooth 4 standard protocol). The device address of the key 100 is added to a settings file stored on the computing device. Further, the user is asked for his username, password, and optionally the domain name if required to log on to this personal computing device 400. The username, password and domain name are encrypted and stored in the same settings file. This completes the key registration process.

Initial communication between the lock and the registered key pair is established as follows every time the lock 200 is connected to a personal computing device 400. When the personal computer device 400 using the key and lock pair is initialized after a period of non-usage, such as when the system is booted on or the lock 200 is attached to a USB socket, the computer software program 300 pre-installed on the personal computing device 400 instructs the lock 200 to search for the key 100 registered in the settings file that was written during the initial registration procedure by the software program 300. During this pre-connection period, the key 100 is in the advertising mode, described below in more detail. Once the key 100 is located by the lock 200, it is validated by comparing its unique device address to the one stored on the computing device 400. If the address matches that stored on the computing device 400, the computer software program 300 instructs the lock 200 to establish an exclusive, secured wireless connection with the key 100, and the key 100 moves out of advertising mode to connection mode. The locking and unlocking operation may now proceed.

In the advertising mode, the key 100 periodically broadcasts a data packet, which may include its device name, the unique address code associated with the key 100, and various optional information about its hardware and software, including by way of non-limiting example firmware/hardware versions, battery charge level, control points allowing various functions to be operated (such as the audible beeper on the key 100), etc. The key 100 enters advertising mode immediately upon being powered up by the installation of the battery, or by losing connection with the lock 200 and exiting the connection mode. From this initial point, for a time period defined as $T_{duration1}$, the key 100 broadcasts the data packet once every $T_{broadcast1}$. At the end of $T_{duration1}$, for a time period defined as $T_{duration2}$, the key 100 broadcasts the data packet once every $T_{broadcast2}$. At the end of $T_{duration2}$, until either the key 100 is powered off by the removal of the battery or connection with the lock is re-established, the key 100 broadcasts the data packet once every $T_{broadcast3}$. In some embodiments, $T_{duration1}$ may be between 2 seconds and 10 seconds; $T_{broadcast1}$ may be between 10 milliseconds and 25 milliseconds; $T_{duration2}$ may be between one hour and three hours; $T_{broadcast2}$ may be between 750 milliseconds and 1000 milliseconds; $T_{broadcast3}$ may be between 1000 milliseconds and 3000 milliseconds. This method of varying the time period between broadcasts may be implemented to enhance the battery life of the key 100. The time period parameters may be altered to make the system more responsive at the cost of key battery life.

Figure 7:
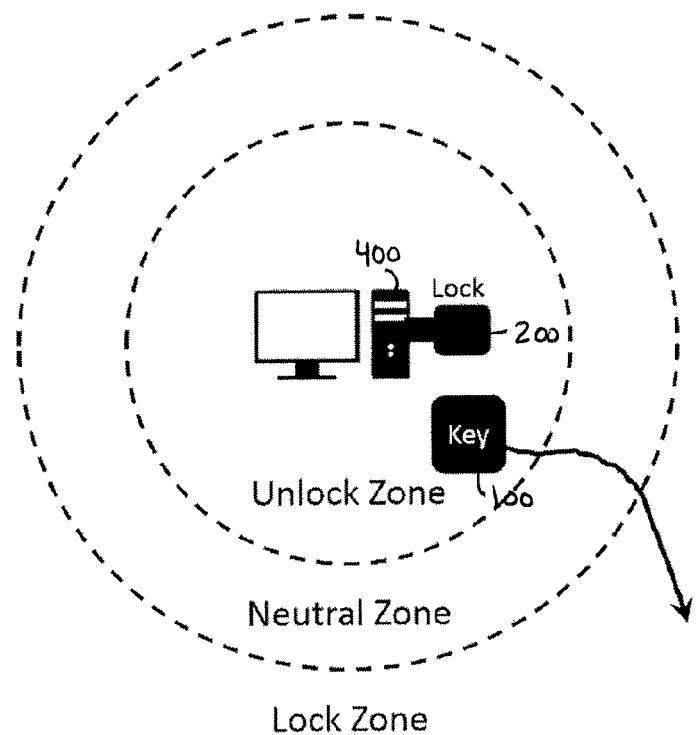
FIG. 7 is a schematic view of the system of FIG. 1 during an unlocking operation.
Figure 8:
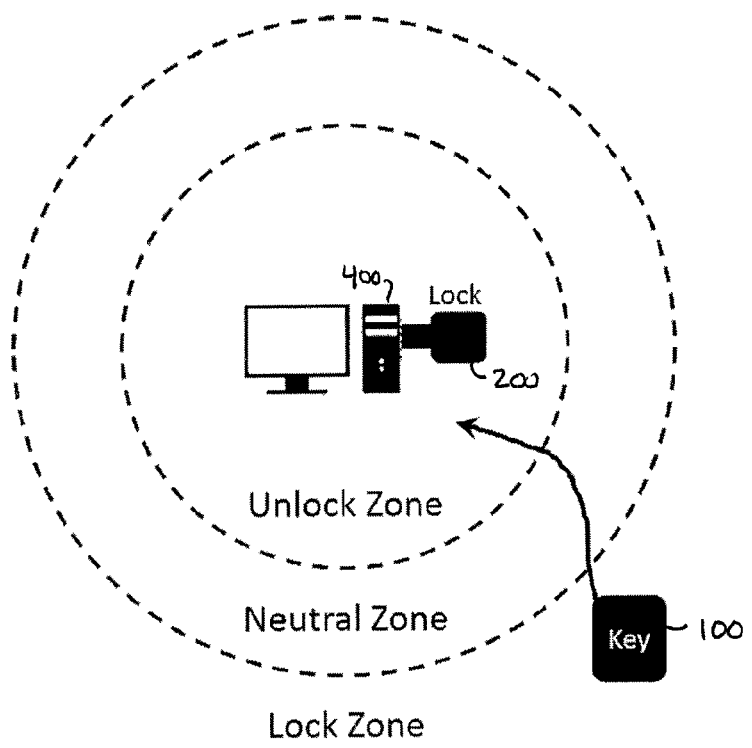
FIG. 8 is a schematic view of the system of FIG. 1 during a locking operation.

The locking and unlocking operation may proceed as follows. While additional detail is provided below, by way of summary (and with reference to FIG. 7), unlocking of a user's computing system resident on personal computing device 400 proceeds as key 100 is moved closer to lock 200, transitioning through the outer lock zone (and optionally through a transitional neutral zone), and enters an unlock zone closest to computing device 400. When the computer software program 300 determines that key 100 has entered such unlock zone, the computing device 400 is unlocked. Likewise (and with reference to FIG. 8), locking of a user's computing system resident on personal computing device 400 proceeds as key 100 is moved away from lock 200, transitioning from the unlock zone (and optionally a transitional neutral zone) and enters the lock zone furthest from the computing device 400. When the computer software program 300 determines that key 100 has entered such lock zone, the computing device 400 is locked. With greater particularity, once connection mode has been entered, the lock 200 periodically asks the key 100 to transmit a small data packet periodically with a period $T_{connect}$. In accordance with certain aspects of an exemplary embodiment, this period may be set to a value between 100 milliseconds and 500 milliseconds. The lock 200 calculates signal strength information by detecting, for example, the Received Signal Strength Information (RSSI) level of the data packets it receives. The lock 200 provides this information to the computer software program 300, which in turn may take the following exemplary steps in order to come to a decision of whether to lock or unlock the computing system 400:

The RSSI data is collected periodically with period $T_{connect}$ and stored after the noise in the data is removed by low pass filtering.

A pre-defined number of filtered RSSI value samples is stored in a buffer. This number is defined as WINDOW_SIZE. In some embodiments, WINDOW_SIZE may vary between 5 and 25.

A histogram of the RSSI values from this sample set is created and normalized. This histogram has a preset number of bins. This number is defined as RANGENUMBER. In some embodiments, RANGENUMBER may vary between 50 and 200. This normalized histogram is defined as $PDF_{OBSERVED}$.

When the computer software program is initialized or when certain user preferences change, the computer software program generates two pre-defined distribution functions, defined as $PDF_{NEAR}$ and $PDF_{FAR}$, which are normal (Gaussian) distributions with mean values MEAN_NEAR and MEAN_FAR and standard deviations SIGMA_NEAR and SIGMA_FAR, respectively. These distribution functions are represented as normalized histograms with the same RANGENUMBER number of bins.

The following values have the following descriptions:
  $E_i^{near}$: The normalized distribution value of $PDF_{NEAR}$ in bin number i, where $1 \leq i \leq RANGENUMBER$.
  $E_i^{far}$: The normalized distribution value of $PDF_{FAR}$ in bin number i, where $1 \leq i \leq RANGENUMBER$.
  $O_i$ is the observed normalized histogram value from $PDF_{OBSERVED}$ in bin number i, where $1 \leq i \leq RANGENUMBER$.

The computer software program calculates the two following ratios:

$$\chi^2_{NEAR} = \frac{\sum_i^{RANGENUMBER} (E_i^{NEAR} - O_i)^2}{\sum_i^{RANGENUMBER} (E_i)^2}$$

$$\chi^2_{FAR} = \frac{\sum_i^{RANGENUMBER} (E_i^{FAR} - O_i)^2}{\sum_i^{RANGENUMBER} (E_i)^2}$$

The computer software program calculates the following ratio:

$$LN = \log\left(\frac{\chi^2_{NEAR}}{\chi^2_{FAR}}\right)$$

In accordance with certain aspects of an exemplary embodiment, the following decision tree may be implemented by the computer software program: If LN is calculated to be smaller than a preset value LN_LOW and the computing system is locked, the computer software program makes the decision to unlock the computing system and initiates the unlocking operations including asking for additional security input from the user if the user preferences are set to require this. If LN is calculated to be larger than a preset value LN_HIGH and the computing system is unlocked, the computer software program makes the decision to lock the computing system and initiates the locking operations. If LN is in between LN_LOW and LN_HIGH, inclusive, the computer software program does not change the computing system state. In certain implementations, LN_LOW may have any value that is preferably lower than 0, and LN_HIGH may have any value that is preferably greater than 1. Moreover, LN_LOW and LN_HIGH may optionally be chosen during implementation to optimize the difference between the distance ranges that will trigger locking or unlocking of the computing system.

In accordance with further aspects of an exemplary embodiment, the following decision tree may be followed by the computer software program: If LN is calculated to be smaller than LN_LOW and the computing system is locked, the computer software program makes the decision to unlock the computing system and initiates the unlocking operations including asking for additional security input from the user if the user preferences are set to require this. If LN is calculated to be larger than LN_HIGH and the mean value of the observed normalized RSSI value distribution, i.e. the mean value of $PDF_{OBSERVED}$, is larger than MEAN_FAR, and if the computing system is unlocked, the computer software program makes the decision to lock the computing system and initiates the locking operations. If LN is between LN_LOW and LN_HIGH, inclusive, the computer software program does not change the computing system state. This embodiment may be implemented to increase reliability of the locking operation in the presence of radio-frequency signal interference and similar detrimental factors.

In accordance with still further aspects of an exemplary embodiment, the following decision tree may be followed by the computer software program: As the RSSI data is being accumulated to update $PDF_{OBSERVED}$ each measurement period, each new RSSI value is compared to MEAN_FAR and MEAN_NEAR. A counter COUNT_FAR is increased by 1 every time the new RSSI value exceeds MEAN_FAR and decreased by 1 every time the new RSSI value falls below MEAN_NEAR. If LN is calculated to be larger than LN_HIGH and COUNT_FAR is larger than a preset value COUNT_FAR_THRESHOLD, and if the computing system is unlocked, the computer software program makes the decision to lock the computing system and initiates the locking operations. If LN is calculated to be smaller than LN_LOW and the computing system is locked, the computer software program makes the decision to unlock the computing system and initiates the unlocking operations including asking for additional security input from the user if the user preferences are set to require this. If LN is between LN_LOW and LN_HIGH, inclusive, the computer software program does not change the computing system state. This embodiment may be implemented to increase reliability of the locking operation in the presence of radio-frequency signal interference and similar detrimental factors.

In each case, if the connection between the lock 200 and the key 100 is lost such that the lock 200 does not receive a new signal from the key 100 and is unable to calculate a new RSSI value, the computer software program 300 makes the decision to lock the computing system 400 and initiates the locking operations.

In accordance with certain aspects of an exemplary embodiment, the user may set the parameters Enable/Disable Auto-Lock, and Enable/Disable Auto-Unlock using the computer software program 300. The user may also perform operations Register Key, Unregister Key, Update Credentials, Adjust Lock/Unlock Range, and Send Feedback using the computer software program 300 as further detailed below.

Register Key: This function allows the user to add a new key to the computer software program.

Unregister Key: This function allows the user to delete a previously added key from the computer software program.

Update Credentials: This function allows the user to update his username, password and network domain.

Enable/Disable Auto-Lock: This function allows the user to either enable or disable the auto-lock feature of the computer software program.

Enable/Disable Auto-UnLock: This function allows the user to either enable or disable the auto-unlock feature of the computer software program.

Adjust Lock/Unlock Range: This function allows the user to adjust the range at which the lock and unlock actions would occur in the computer software program.

Send Feedback: This function allows the user to send the log file associated with the computer software program and stored on the computer to a remote server.

The distance range at which the computer software program will typically make the decision to lock the computing device if the key 100 is carried beyond this distance, or the distance range at which the computer software program will typically make the decision to unlock the computing device if the key 100 is brought within this distance, preferably may be adjusted by the user through the Adjust Lock/Unlock Range option, which may be implemented as an electronic slider on a user interface. The position of the slider may define the values MEAN_NEAR and MEAN_FAR, which are used to generate the pre-defined distribution functions in the computer software program, as described above.

Optionally, the system may require the user to provide authorization through another authentication method once the computer software program has made the decision to unlock the personal computing system but before the personal computing system is unlocked. This supplementary method may be a password entered by the user, a biometric provided by the user (such as a fingerprint or a voice print), or the use of another authentication device such as a keycard.

Figure 9:
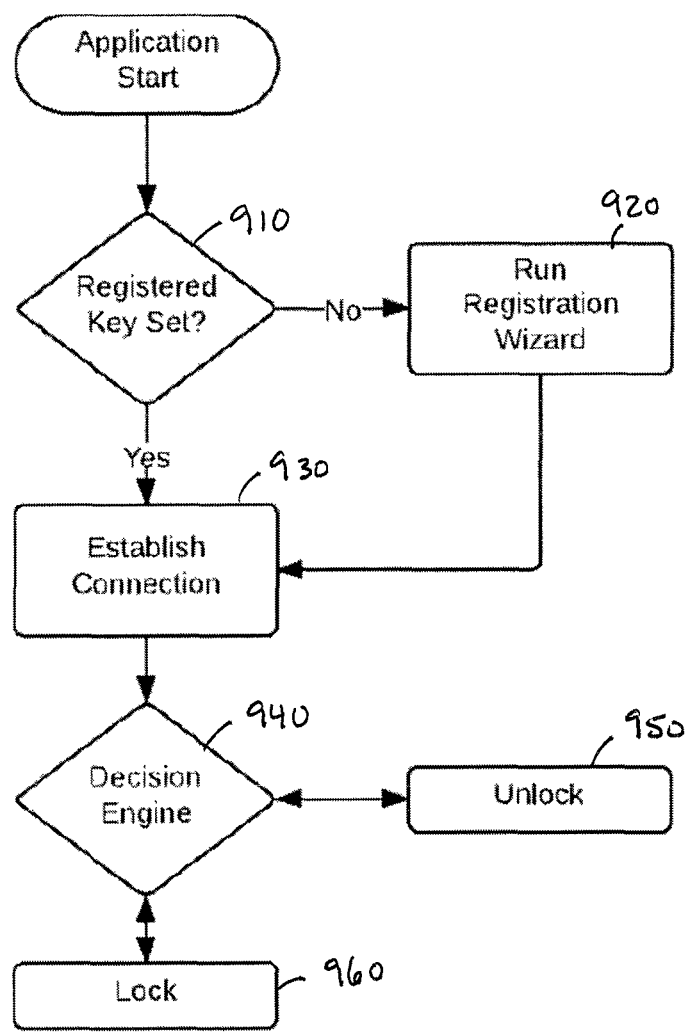
FIG. 9 is a flowchart showing an exemplary method for wireless proximity-based access to a computing device in accordance with certain aspects of an embodiment of the invention.

FIG. 9 is an exemplary flowchart reflecting steps carried out by the system described above in accordance with aspects of an embodiment of the invention. At step 910, after having identified the presence of a key as described in detail above, the computer software program 300 determines whether the located key reflects a registered key set reflected in an electronic file stored on the computing device. If not, at step 920, the program 300 runs a registration wizard to setup the key 100 for communication with lock 200. After a key 100 is set up to communicate with lock 200, the computer software program 300 at step 930 enables a secure, exclusive, wireless communication channel to be established between the key 100 and the lock 200. Thereafter, at step 940, the computer software program 300 executes the decision engine as detailed above to determine the physical proximity of the key 100 to lock 200, and in response to determining that proximity, either causes the computing system at step 950 to enter (or maintain) an unlocked state (following a determination that the key 100 is sufficiently close to lock 200 using the determinative methods detailed above), or at step 960 to enter (or maintain) a locked state (following a determination that the key 100 is a sufficient distance away from lock 200 using the determinative methods detailed above).

The key 100, lock 200, and the computer software program 300 described above may be put in use in an office setting to facilitate the implementation of information technology security procedures in order to, for instance, protect intellectual property, technical know-how and similar confidential information belonging to a company. Another potential application area may be in a health-care facility for personal computing devices that are used to enter and keep confidential patient information to ensure patient confidentiality and HIPAA compliance. Another potential application may be in a home or public setting to protect the privacy of a personal computing device user and the integrity of the computing system and the user's data.

With reference again to FIG. 1, a secondary application mode for the key 100 may be implemented in conjunction with a computer software program on a separate portable computing device 500, such as (by way of non-limiting example) a smartphone application. The smartphone application may incorporate the Add, Delete, Locate and Alert functions as follows.

The smartphone application can be set to "ALERT" mode wherein the smartphone 500 starts beeping when it is moved away from the key 100. In the "ALERT" mode, if the user carrying the smartphone 500 walks away from the key 100, it will start beeping and warn him that he/she has forgotten the key.

The smartphone application can also be set to "LOCATE" mode in which the user can use the smartphone application to locate the key 100. In this scenario, the smartphone application will connect to the key 100 and indicate to the user how far the key 100 is from the smartphone 500. This indication may be presented, by way of non-limiting example, by a display of a vertical bar shown on the smartphone 500. The bar will be filled in accordance with how far the key 100 is from the smartphone 500. If the key 100 is far away, the bar will appear empty. Likewise, if the key is near, the bar will appear full.

In the "LOCATE" mode, the smartphone application will also send a command to the key 100 that will cause it to beep regularly. The beep will be turned off once the user exits the "LOCATE" mode.

The "ADD" function will allow the user to add a key to the smartphone application. The user will be able to scan keys in the vicinity of the smartphone 500, choose the one he wants to add to the smartphone application, give it a name, and then add the same to the smartphone application.

The "ADD" function may also allow the user to take a picture and associate that with the specific key 100. This picture can be taken using the smartphone's camera, or loaded from a gallery on the smartphone.

The "DELETE" function will allow the user to delete a previously stored key from the smartphone application.

Last, the "EDIT" function will allow the user to edit the name or picture associated with a previously stored key on the smartphone application.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A system for wireless proximity-based access to a computing device, comprising:
 a portable wireless transmitter having a unique electronic address code associated therewith;
 a wireless receiver configured for connection to said computing device and for wireless communication with said portable wireless transmitter; and
 a computer software program executable on said computing device configured to cause said computing device to:
  generate an encrypted electronic file comprising said unique address code associated with said portable wireless transmitter, an encrypted version of a username of a user associated with said portable wireless transmitter, and an encrypted version of a password of said user associated with said portable wireless transmitter;
  provide an electronic instruction to said wireless receiver to search for a portable wireless transmitter having a unique address code matching said unique address code in said electronic file;
  make a determination of at least whether to maintain said computing device in a locked state preventing access to functions of said computing device, to change a state of said computing device to a locked state preventing access to functions of said computing device, or to change a state of said computing device to an unlocked state allowing access to functions of said computing device, wherein said determination is based upon a comparison of relative differences between (i) a difference between a numeric value representative of a signal strength parameter of a data packet requested by said wireless receiver and transmitted by said portable wireless transmitter to said wireless receiver and a normalized far signal strength value representing a signal strength level indicating that the portable wireless transmitter has been moved a first distance away from said wireless receiver, and (ii) a difference between said numeric value representative of a signal strength parameter of said data packet requested by said wireless receiver and transmitted by said portable wireless transmitter to said wireless receiver and a normalized near signal strength value representing a signal strength level indicating that the portable wireless transmitter has been moved a second distance away from said wireless receiver, which said second distance is less than said first distance; and
  in response to said determination, instructing said wireless receiver to either prevent access to functions of said computing device or to allow access to functions of said computing device.

2. The system of claim 1, wherein said username comprises a data value readable by access software native to said computing device and identifying said user as an authorized user of said computing device, and said password comprises a data value readable by said access software and allowing said user to access said computing device.

3. The system of claim 2, wherein instructing said wireless receiver to allow access to functions of said computing device further comprises decrypting said encrypted version of said username and said encrypted version of said password into a data format readable by said access software, and transferring said username and said password to said access software.

4. The system of claim 1, wherein said computer software program is further configured to cause said computing device to provide said electronic instruction to said wireless receiver upon startup of said computing device from a shut down, hibernated, or sleeping state.

5. The system of claim 1, wherein said wireless receiver is further configured to establish an exclusive, secure wireless communication channel with said portable wireless transmitter upon locating said unique address code.

6. The system of claim 5, wherein said portable wireless transmitter is further configured to transmit said unique address code repeatedly at varying repetition frequencies that vary over time.

7. The system of claim 6, wherein said portable wireless transmitter is further configured to transmit said unique address code repeatedly at a first repetition frequency for a first time duration upon either of powering on said portable wireless transmitter, and termination of said secure wireless communication channel.

8. The system of claim 7, wherein said portable wireless transmitter is further configured to, upon expiration of said first time duration, transmit said unique address code repeatedly at a second repetition frequency that is slower than said first repetition frequency and for a second time duration that is greater than said first time duration.

9. The system of claim 8, wherein said portable wireless transmitter is further configured to, upon expiration of said second time duration, transmit said unique address code repeatedly at a third repetition frequency that is slower than said second repetition frequency indefinitely until a secure communication channel is established between said portable wireless transmitter and said wireless receiver, or until said portable wireless transmitter is powered down by the user removing its battery.

10. The system of claim 9, wherein at least one of said first repetition frequency, said first time duration, said second repetition frequency, said second time duration, and said third repetition frequency is adjustable by said user.

11. The system of claim 8, wherein transmitting said unique address code at said second repetition frequency depletes a battery powering said portable wireless transmitter at a rate that is slower than depletion resulting from transmitting said unique address code at said first repetition frequency.

12. The system of claim 9, wherein transmitting said unique address code at said third repetition frequency depletes a battery powering said wireless transmitter at a rate that is slower than depletion resulting from transmitting said unique address code at said second repetition frequency.

13. The system of claim 1, wherein said wireless receiver further comprises a hardware device having a USB connector and configured for wireless communication using a secure, ultra-low power wireless communication protocol.

14. The system of claim 13, wherein said portable wireless transmitter further comprises a portable hardware device having a battery and a microprocessor having a fixed memory including therein said unique electronic address code, and configured for wireless communication using a secure, ultra-low power wireless communication protocol.

15. The system of claim 1, wherein said wireless receiver is further configured to, upon establishment of a secure communication channel, periodically request transmission of said data packet by said portable wireless transmitter, and to calculate said signal strength level of said data packet transmitted by said portable wireless transmitter to said wireless receiver, and to transfer said calculated signal strength level to said computer software program.

16. The system of claim 1, wherein said determination is representative of whether said portable wireless transmitter is within a pre-defined physical range of said wireless receiver.

17. The system of claim 1, said portable wireless transmitter further comprising firmware configured to measure an energy level of a battery powering said portable wireless transmitter, and to transmit data representative of said energy level through said wireless receiver and to said computer software program.

18. The system of claim 1, wherein said computer software program is further configured to require said user to enter a secondary identification in order to allow access to functions of said computing device, wherein said secondary identification is selected from the group consisting of a keyboard-based password, a fingerprint scan, and a voice-print.

19. The system of claim 1, wherein said wireless receiver further comprises a voltage regulator configured to supply a wireless communication device on said wireless receiver with first voltage level required by said wireless communication device using a USB port power output of a second voltage level.

20. The system of claim 1, wherein said computer software program is further configured to generate an electronic user interface that may engaged by said user, wherein said user interface provides selectable functions to the user to instruct said computer software program to do at least one of:
  registering a new portable wireless transmitter with said computer software program to generate an electronic file for said new portable wireless transmitter;
  unregistering a previously registered portable wireless transmitter from said computer software program and delete an electronic file for said previously registered portable wireless transmitter;
  updating credentials of said user in an electronic file for a previously registered portable wireless transmitter, wherein said credentials comprise at least one of said user's username, password, and network domain;
  enabling and disabling an auto-lock function of said computer software program;
  enabling and disabling an auto-unlock function of said computer software program; and
  adjusting a lock and unlock physical range at which said computer software program will execute said auto-lock and said auto-unlock functions.

21. The system of claim 1, further comprising a second computer software program executable on a portable computing device and configured to cause said portable computing device to:
  generate an alert when said portable computing device is moved a predesignated distance away from said portable wireless transmitter;
  establish a wireless data connection with said portable wireless transmitter and display an indication of a distance from said portable computing device at which said portable wireless transmitter is located; and
  send an audio device activation signal to said portable wireless transmitter configured to cause an audio source on said portable wireless transmitter to generate an audible sound.

22. The system of claim 21, wherein said wireless data connection between said portable computing device and said portable wireless transmitter is encrypted.

* * * * *